US012565983B1

(12) United States Patent
Bai et al.

(10) Patent No.: US 12,565,983 B1
(45) Date of Patent: Mar. 3, 2026

(54) SPLICED LIGHT

(71) Applicant: NINGBO JINGHUI OPTO-ELECTRONIC CO., LTD., Ningbo (CN)

(72) Inventors: Guohui Bai, Ningbo (CN); Xia Xiao, Ningbo (CN)

(73) Assignee: NINGBO JINGHUI OPTO-ELECTRONIC CO., LTD. (CN)

( * ) Notice: Subject to any disclaimer, the term of this patent is extended or adjusted under 35 U.S.C. 154(b) by 0 days.

(21) Appl. No.: 19/033,340

(22) Filed: Jan. 21, 2025

(30) Foreign Application Priority Data

Sep. 2, 2024 (CN) ......................... 202422135912.1

(51) Int. Cl.
*F21V 19/00* (2006.01)
*F21V 15/015* (2006.01)
*F21V 19/04* (2006.01)
*F21V 23/06* (2006.01)

(52) U.S. Cl.
CPC .......... *F21V 19/004* (2013.01); *F21V 15/015* (2013.01); *F21V 19/04* (2013.01); *F21V 23/06* (2013.01)

(58) Field of Classification Search
CPC ........ F21V 23/06; F21V 19/04; F21V 19/004; F21V 15/015; H01R 13/7172; H01R 13/717; H01R 13/33
See application file for complete search history.

(56) References Cited

U.S. PATENT DOCUMENTS 11,906,145 B2 * 2/2024 Zhan ..................... F21V 17/107

FOREIGN PATENT DOCUMENTS

EP 3385602 A1 * 10/2018 ............. F21K 9/275

OTHER PUBLICATIONS

Innovation Q+ NPL Search (Year: 2025).*

* cited by examiner

*Primary Examiner* — Anabel Ton
(74) *Attorney, Agent, or Firm* — Ferguson Case Orr Paterson LLP

(57) ABSTRACT

The disclosure provides a spliced light. Mounting holes with openings in upper ends are formed in each joint assembly, and clamping portions located on side walls of outer sides of the mounting holes are arranged on the joint assembly; and the clamping portions are elastic clamping pieces, the elastic clamping pieces located on the side walls of the outer sides of the mounting holes are arranged on the joint assembly, and light bodies are spliced into the mounting holes vertically and clamped through the elastic clamping pieces. By forming the mounting holes with the openings in the upper ends, the light bodies are inserted into the mounting holes from above and clamped through the clamping portions, so that the light bodies are more convenient to mount and dismount and do not need to be pulled in a direction towards two sides by a certain distance for dismounting.

9 Claims, 7 Drawing Sheets

SPLICED LIGHT

TECHNICAL FIELD

The disclosure relates to the technical field of spliced lights, in particular to a spliced light.

BACKGROUND

An LED light is an electroluminescent semiconductor material chip, which is formed by curing onto a support with silver glue or white glue, then connecting a chip and a circuit board with silver wires or gold wires, sealing a periphery with epoxy resin to play a role in protecting an internal core wire, and finally mounting a housing, so a shock resistance of the LED light is good. A light body is another name of a light strip due to its shape, which is named with a shape and an associated material, just like Chinese pictographic characters. There are common appellations such as a Great Wall light body, an LED light body, an LED soft light bar, a light bar and an FPC light body.

However, a conventional light body on the market is in ordinary design at present, the light body is connected with a joint assembly in an inserted manner, the light body needs to be separated from the joint assembly during dismounting, and the light body needs to be pulled in a direction opposite to the joint assembly by a certain distance so that the light body may be dismounted, which is not only inconvenient for dismounting, but also prone to damaging the light body and the joint assembly.

SUMMARY

(1) A Technical Problem to be Solved

The problem to be solved by the disclosure is to provide a spliced light, which can make a light body and a spliced part more convenient to dismount.

(2) A Technical Solution

For solving the technical problem, the disclosure provides a spliced light, including joint assemblies and light bodies, wherein every two adjacent light bodies are connected through one joint assembly, mounting holes with openings in upper ends are formed in each joint assembly, and clamping portions located on side walls of outer sides of the mounting holes are arranged on the joint assembly; and each clamping portion is an elastic clamping piece, the elastic clamping pieces located on the side walls of the outer sides of the mounting holes are arranged on the joint assembly, and the light bodies are spliced into the mounting holes vertically and clamped through the elastic clamping pieces.

In the solution, by forming the mounting holes with the openings in the upper ends, the light bodies are inserted into the mounting holes from above and clamped through the clamping portions, so the light bodies are more convenient to mount and dismount and do not need to be pulled in a direction towards two sides by a certain distance for dismounting, and a service life of the joint assembly may be ensured.

Preferably, each joint assembly includes a bottom plate, a bottom shell, a power-connecting copper sheet and a copper sheet joint, the bottom shell is arranged on the bottom plate, the power-connecting copper sheet is arranged in the bottom shell, the copper sheet joint is connected with the power-connecting copper sheet, a shell cover is arranged on the bottom shell in a buckling manner, the mounting holes are formed in the shell cover, and the copper sheet joint is exposed out of the shell cover and located in the mounting holes.

As a further preference, connecting portions are arranged at two ends of each light body.

In the solution, the connecting portions are arranged to more stably connect the light bodies and the joint assemblies.

As a further preference, inserting holes are formed in bottoms of the connecting portions, connecting blocks located at a position of the copper sheet joint are arranged on a bottom wall of a mounting groove, and the connecting blocks are inserted into the inserting holes.

In the solution, by arranging the inserting holes and the connecting blocks, the light bodies are positioned preliminarily, so that a mounting position is more accurate.

As a further preference, chamfered surfaces are formed between side walls and top walls of the connecting portions, and the connecting portions are mounted in the mounting holes and clamped and fixed through cooperation of the clamping portions and the chamfered surfaces.

In the solution, by cooperation of the chamfered surfaces and the elastic clamping pieces, the light bodies are clamped in the mounting holes, and positions of the light bodies are fixed again, so that the light bodies cannot be separated out of the mounting holes.

As a further preference, a long-strip hole is formed in the bottom plate.

In the solution, a mounting position of the spliced light may be adjusted by forming the long-strip hole, which makes mounting more convenient.

As a further preference, each joint assembly includes a tee joint, the tee joint includes two male ports and a female port, the male ports and the female port may be all connected with the light bodies, the female port of at least one tee joint is connected with a power supply connector, and the power supply connector is connected with a power supply for providing power.

In the solution, the male ports and the female port may be all connected with the light bodies so as to more facilitate splicing of the light bodies, and the female port is connected with the power supply connector, so an external power supply may provide power for the light bodies.

As a further preference, each joint assembly further includes a two-way joint, and the light bodies may be connected with ports of the two-way joint.

In the solution, the light bodies may be more conveniently spliced by arranging the two-way joint and the tee joint, and there may be more shapes.

As a further preference, the elastic clamping pieces located on side walls of two sides of the mounting holes are arranged on the joint assembly, each elastic clamping piece includes a vertical portion and a microbend portion which are integrally formed, the vertical portions and side end faces of the light bodies match for limiting, and the microbend portions and the chamfered surfaces match to fix the light bodies.

As a further preference, an opening is formed in a front side of each port of the joint assembly, fixing grooves are formed in the connecting blocks, fixing inserting blocks are arranged in the inserting holes, the fixing inserting blocks are inserted into the fixing grooves, first matching portions are arranged in side edges of one sides of the inserting holes away from the fixing inserting blocks, second matching portions are arranged on the connecting blocks, and the first matching portions match the second matching portions.

(3) Beneficial Effects

The disclosure provides a spliced light, (1) the light bodies are inserted into the mounting holes from above by forming the mounting holes with the openings in the upper ends and clamped through the clamping portions, so that the light bodies are more convenient to mount and dismount and do not need to be pulled in the direction towards two sides by the certain distance for dismounting, and the service life of the joint assembly may be ensured.

(2) The mounting position of the spliced light may be adjusted by forming the long-strip hole, which makes mounting more convenient.

BRIEF DESCRIPTION OF FIGURES

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

Figure 1:
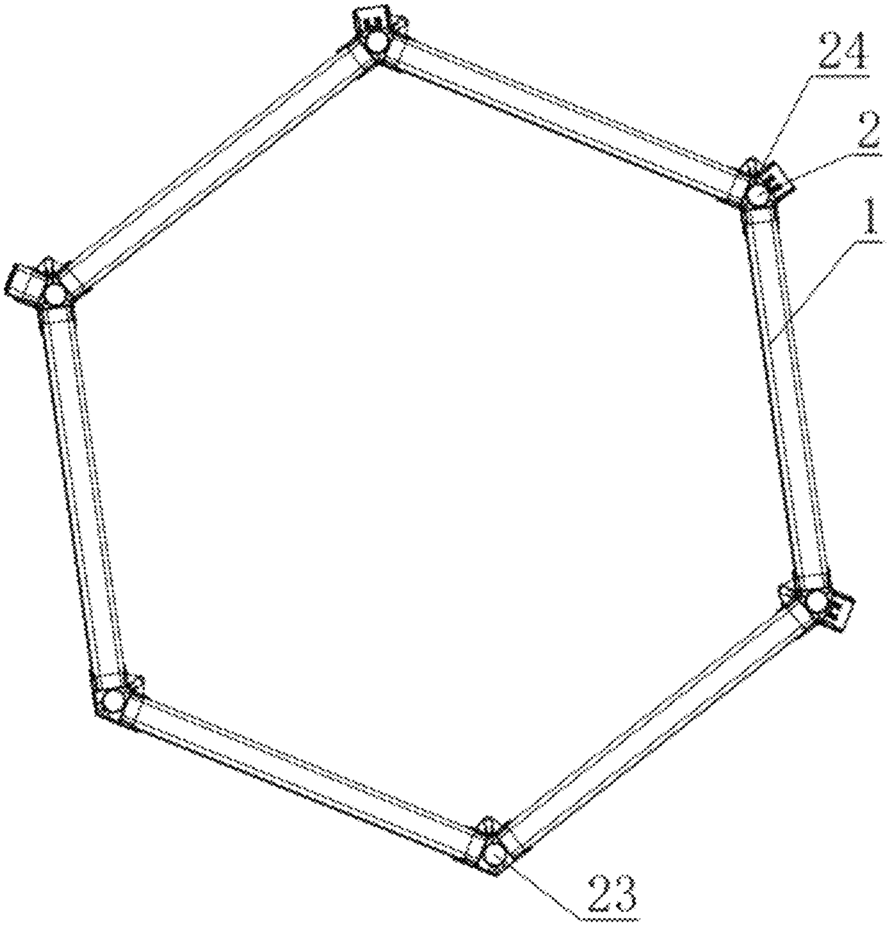
FIG. 1 is a schematic structural diagram of a spliced light in the disclosure.

Names of components corresponding to reference numerals in the drawings are: 1, light body; 2, joint assembly; 21, mounting hole; 22, clamping portion; 221, elastic clamping piece; 23, two-way joint; 24, tee joint; 241, male port; 242, female port; 25, bottom plate; 251, long-strip hole; 26, bottom shell; 27, power-connecting copper sheet; 28, copper sheet joint; 29, shell cover; 3, power supply connector; 4, connecting portion; 41, inserting hole; 42, connecting block; 43, chamfered surface; 5, vertical portion; 51, microbend portion; 6, fixing groove; 61, fixing inserting block; 62, first matching portion; and 63, second matching portion.

DETAILED DESCRIPTION

The present application will be described in detail below in conjunction with accompanying drawings and specific embodiments.

The implementation manners of the present invention will be described below with reference to specific examples. Those skilled in the art may easily understand other advantages and effects of the present invention by the contents disclosed in the present specification. Apparently, the described embodiments are merely a part of embodiments of the disclosure and are not all the embodiments. The present invention may also be implemented or applied through other different specific implementation manners. Various modifications or changes may also be made on the details in the present specification without departing from the spirit of the present invention based on different viewpoints and applications. It should be noted that in the absence of conflicts, the following embodiments and features in the embodiments may be combined mutually. All other embodiments obtained by those of ordinary skill in the art based on the embodiments of this application without making creative efforts shall fall within the protection scope of this application.

It is to be noted that the following describes various aspects of embodiments within the scope of the appended claims. Apparently, the described aspect herein may be embodied in widely various forms, and any particular structure and/or function described herein are/is only explanatory. Based on this application, those skilled in the art should understand that one aspect described herein may be implemented independently of any other aspect, and two or more of these aspects may be combined in various manners. For example, a device and/or method may be implemented and/or practiced by any number and aspect described herein. Besides, the device and/or method may be implemented and/or practiced by other structures and/or functions besides one or more of aspects described herein.

It should also be noted that the drawings provided in the following embodiments only schematically illustrate the basic concept of the present application, and the drawings show only the components related to the present application instead of being drawn according to the quantity, shape and size of the components in actual implementation. In actual implementation, the shape, quantity and proportion of the components may be changed at will, and the layout of components may be more complicated.

Besides, in the following description, specific details are provided for conveniently and thoroughly understanding examples. However, those skilled in the art will understand that it may be practiced without these particular details.

The technical solution provided by the embodiments of the present application will be described with reference to the accompanying drawings.

Figure 2:
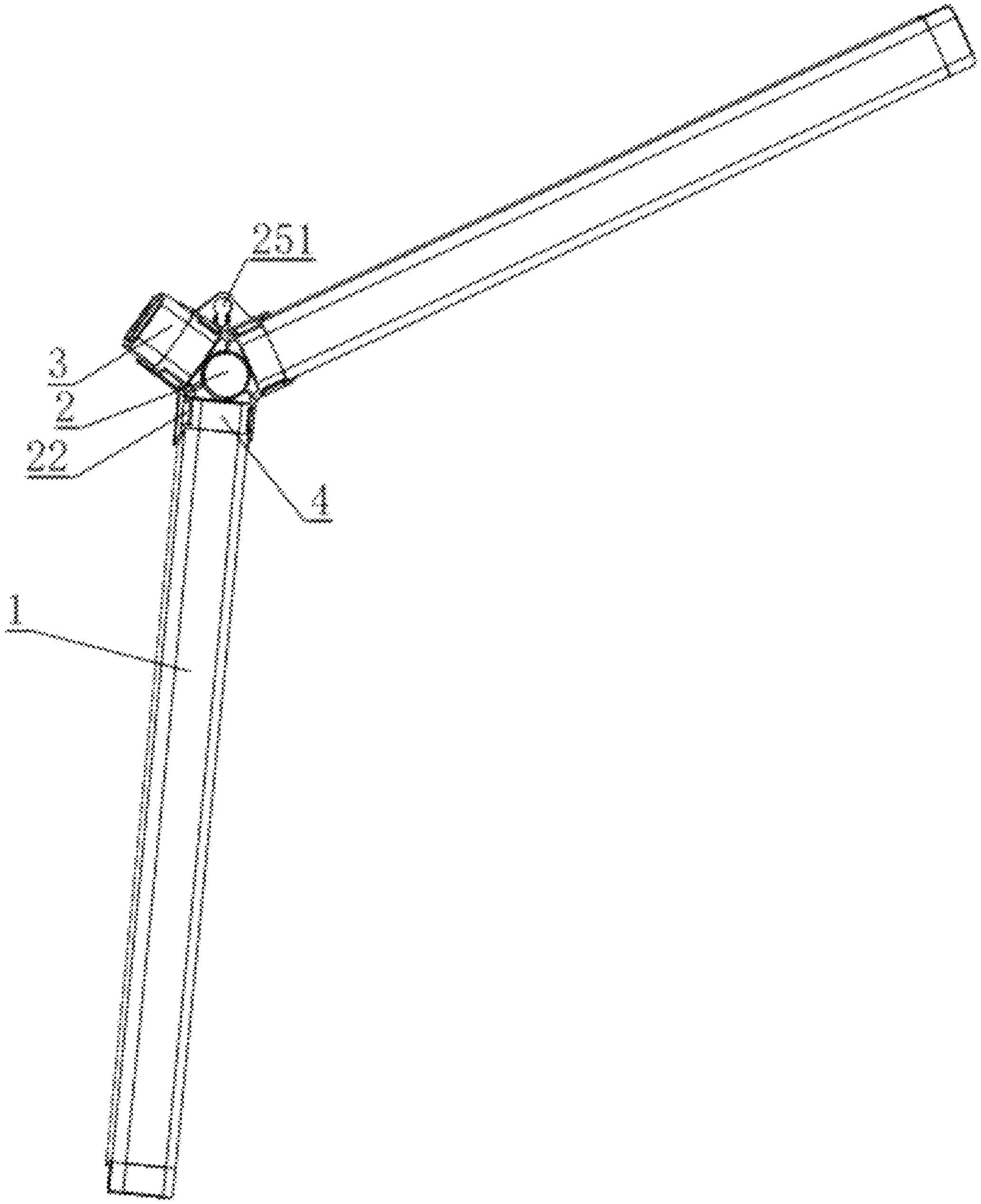
FIG. 2 is a schematic structural diagram of a light body and a joint assembly of a spliced light in the disclosure.
Figure 3:
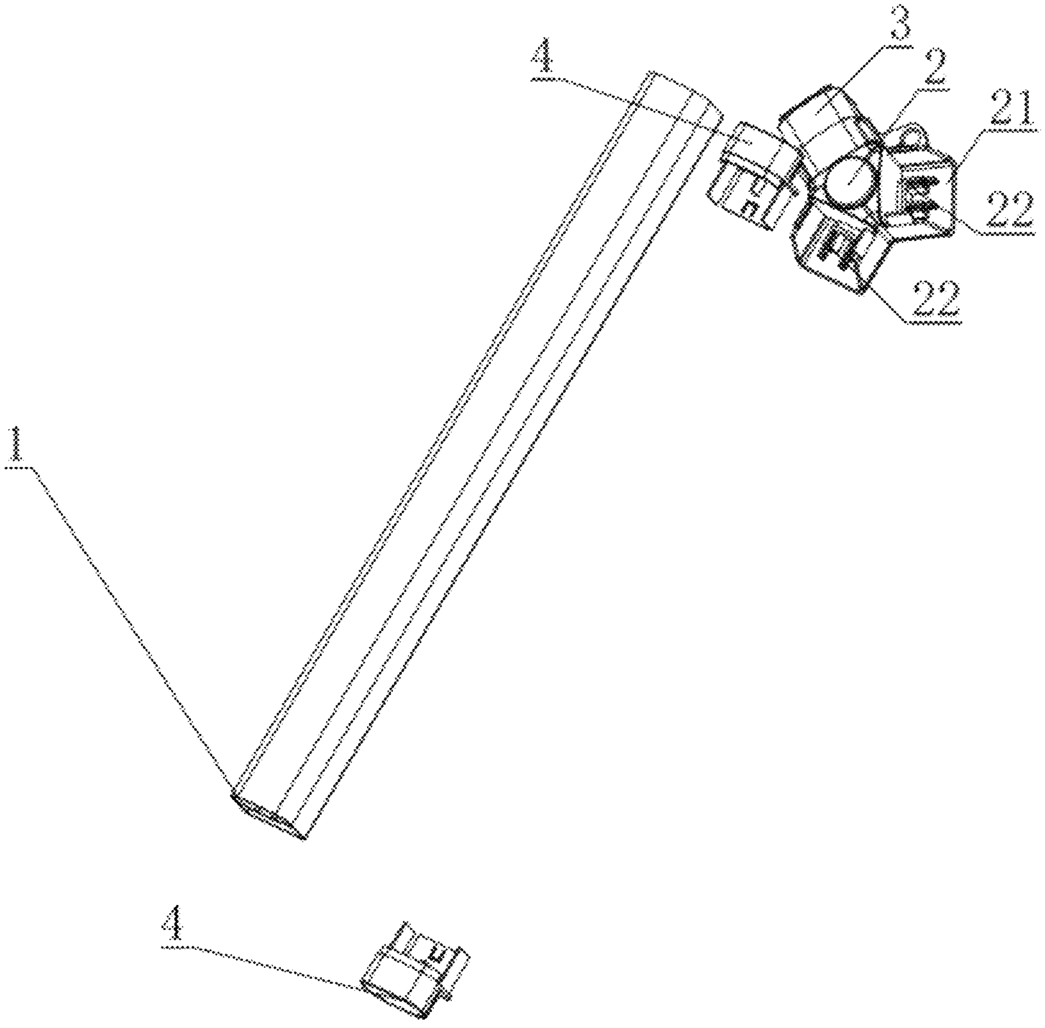
FIG. 3 is a schematic structural explosive view of a light body and a joint assembly of a spliced light in the disclosure.
Figure 4:
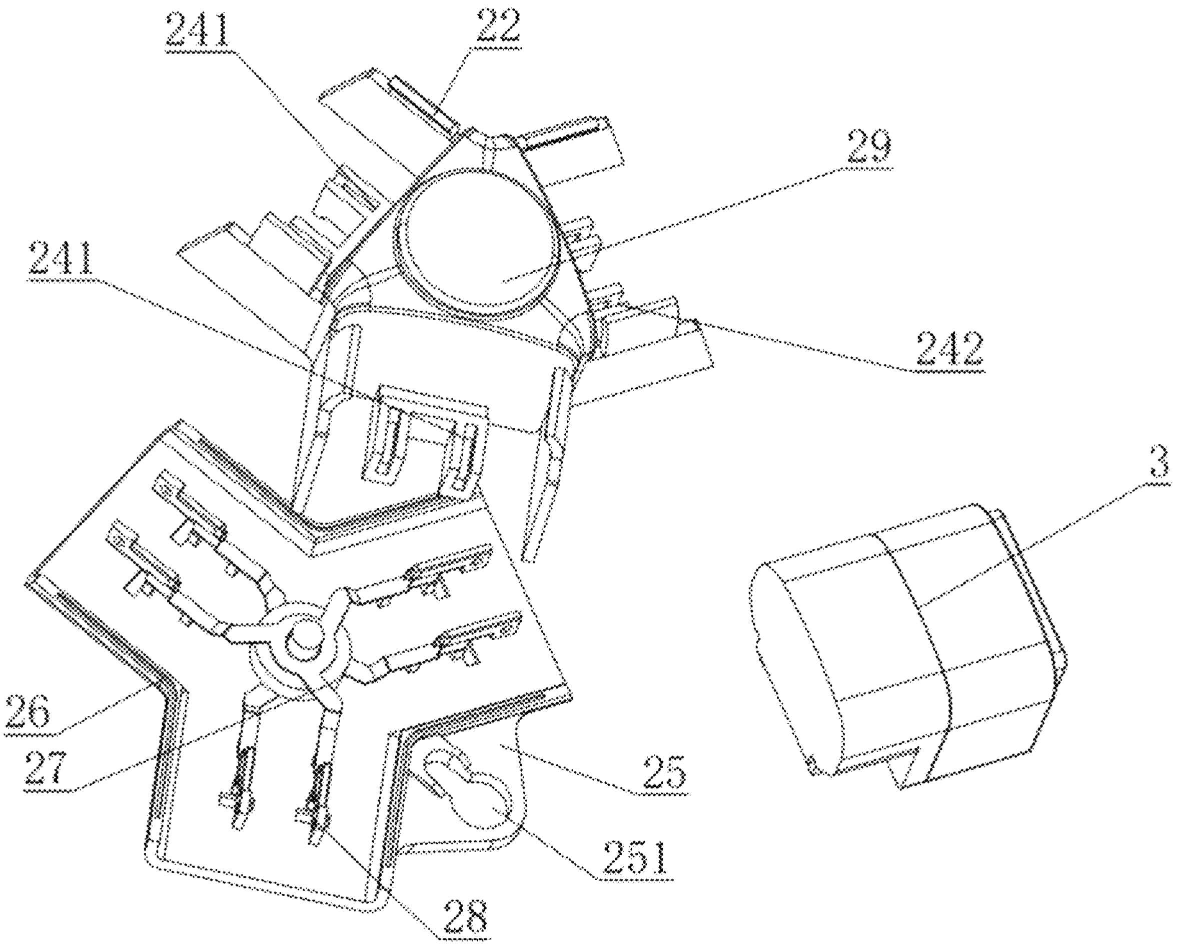
FIG. 4 is a first schematic structural explosive view of a joint assembly of a spliced light in the disclosure.
Figure 5:
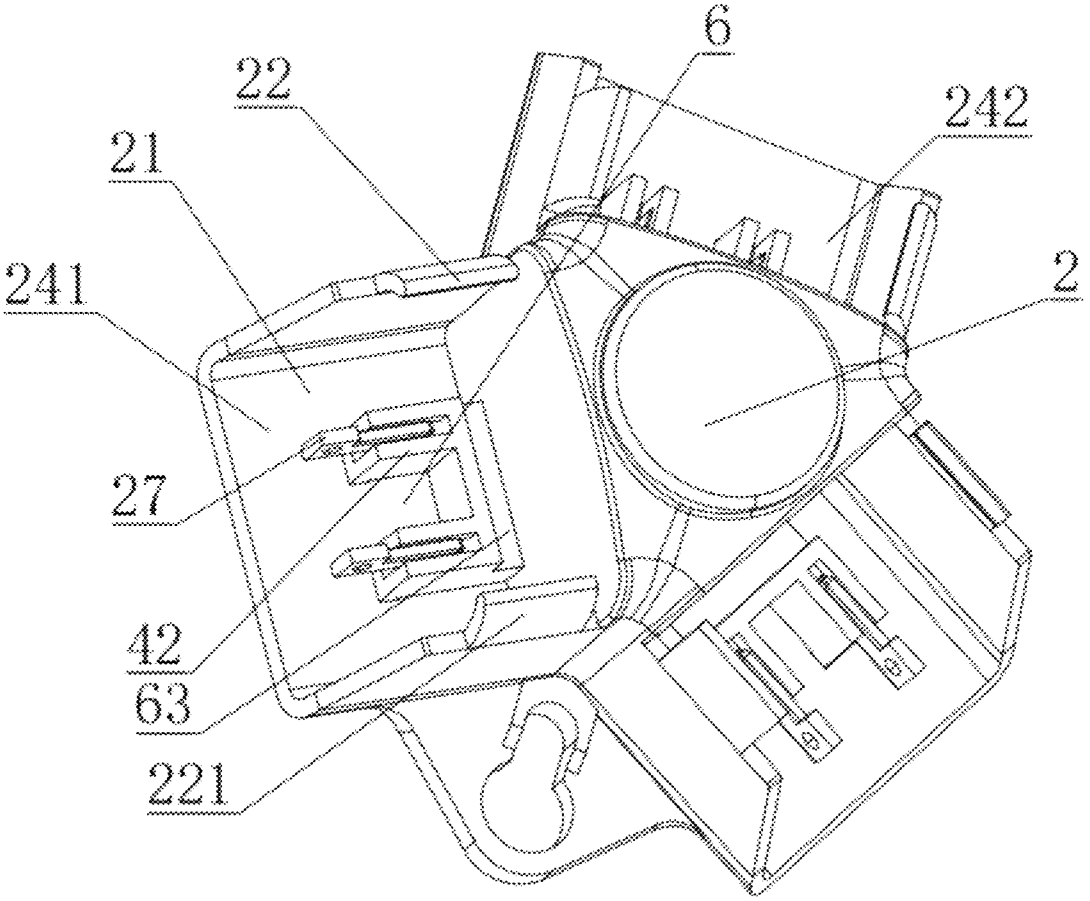
FIG. 5 is a schematic structural diagram of a joint assembly of a spliced light in the disclosure.
Figure 6:
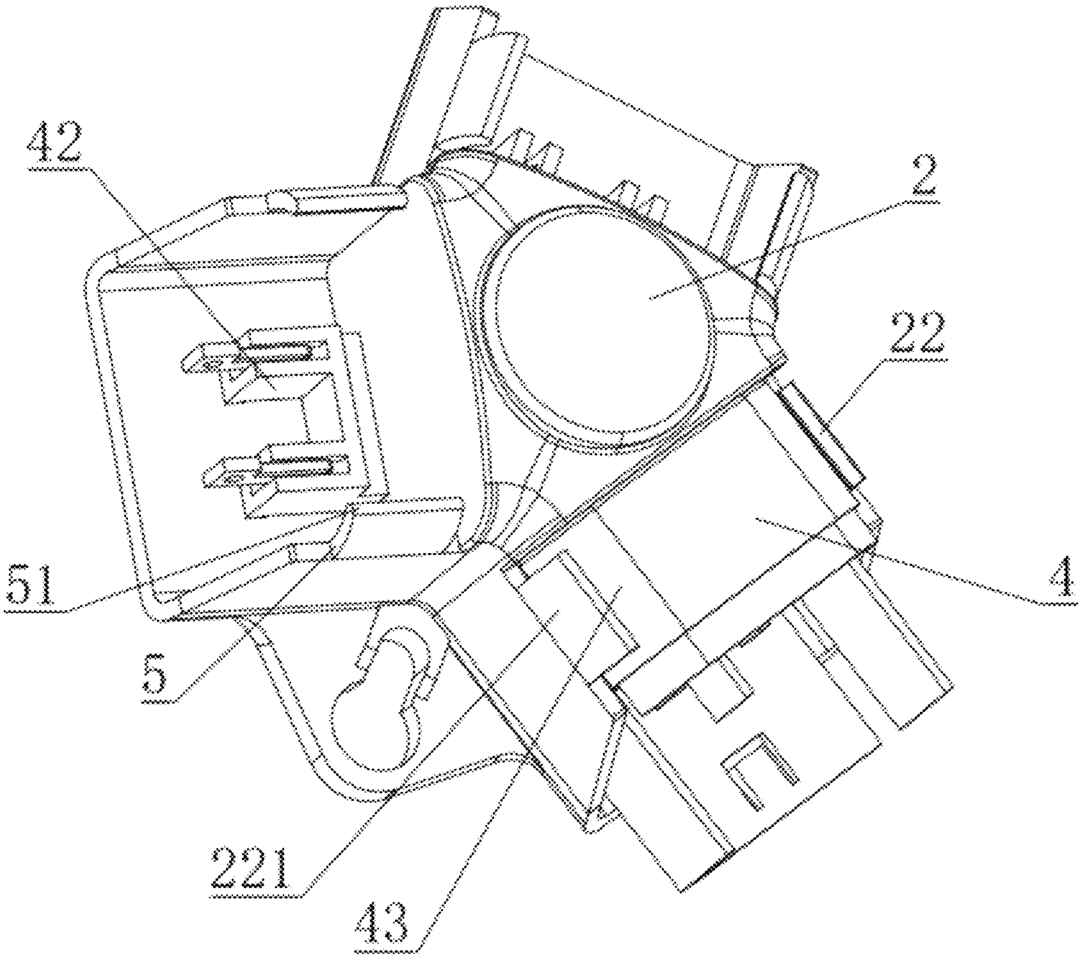
FIG. 6 is schematic structural diagram of connection of a joint assembly and connecting portions of a spliced light in the disclosure.
Figure 7:
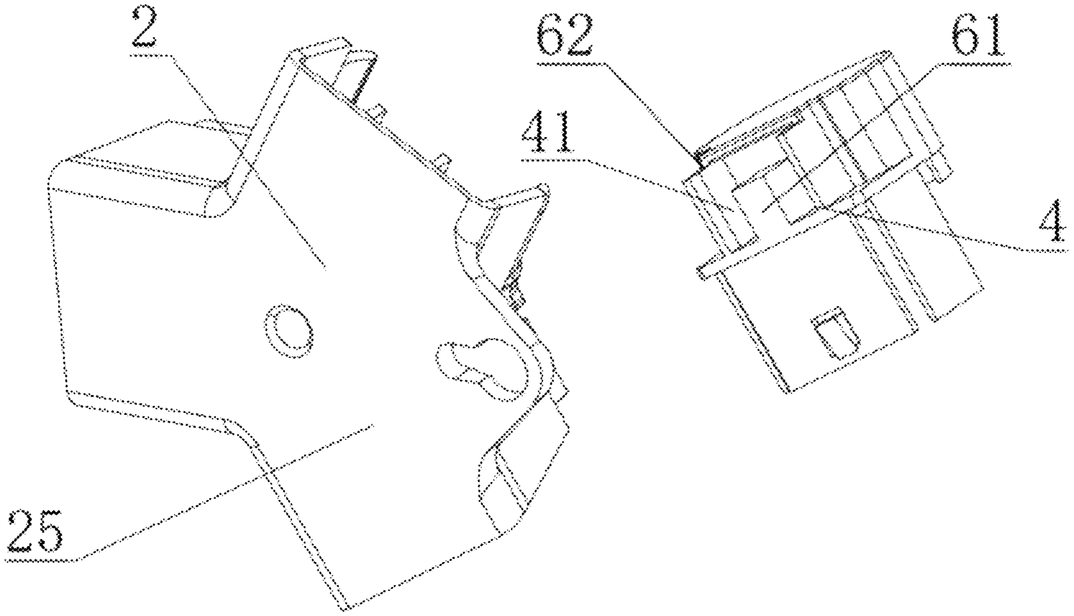
FIG. 7 is a second schematic structural explosive view of connection of a joint assembly and connecting portions of a spliced light in the disclosure.

With reference to FIG. 1 to FIG. 7, the disclosure provides a spliced light, including joint assembles 2 and light bodies 1, every two adjacent light bodies 1 are connected through one joint assembly 2, mounting holes 21 with openings in upper ends are formed in each joint assembly 2, and clamping portions 22 located on side walls of outer sides of the mounting holes 21 are arranged on the joint assembly 2.

Each clamping portion 22 is an elastic clamping piece 221, the elastic clamping pieces 221 located on the side walls of the outer sides of the mounting holes 21 are arranged on the joint assembly 2, and the light bodies 1 are spliced into the mounting holes 21 vertically and clamped through the elastic clamping pieces 221.

Further, as a preferred implementation, each joint assembly 2 includes a bottom plate 25, a bottom shell 26, a power-connecting copper sheet 27 and a copper sheet joint 28, the bottom shell 26 is arranged on the bottom plate 25, the power-connecting copper sheet 27 is arranged in the bottom shell 26, the copper sheet joint 28 is connected with the power-connecting copper sheet 27, a shell cover 29 is arranged on the bottom shell 26 in a buckling manner, the mounting holes 21 are formed in the shell cover 29, and the copper sheet joint 28 is exposed out of the shell cover 29 and located in the mounting holes 21.

Further, as a preferred implementation, connecting portions 4 are arranged at two ends of each light body 1.

Further, as a preferred implementation, inserting holes 41 are formed in bottoms of the connecting portions 4, connecting blocks 42 located at a position of the copper sheet joint 28 are arranged on a bottom wall of a mounting groove, and the connecting blocks 42 are inserted into the inserting holes 41.

Further, as a preferred implementation, chamfered surfaces 43 are formed between side walls and top walls of the connecting portions 4, and the connecting portions 4 are mounted in the mounting holes 21 and clamped and fixed through cooperation of the clamping portions 22 and the chamfered surfaces 43.

Further, as a preferred implementation, the elastic clamping pieces 221 located on side walls of two sides of the mounting holes 21 are arranged on the joint assembly 2, each elastic clamping piece 221 includes a vertical portion 5 and a microbend portion 51 which are integrally formed, the vertical portions 5 and side end faces of the light bodies 1 match for limiting, and the microbend portions 51 and the chamfered surfaces 43 match to fix the light bodies 1.

Further, as a preferred implementation, an opening is formed in a front side of each port of the joint assembly 2, fixing grooves 6 are formed in the connecting blocks 42, fixing inserting blocks 61 are arranged in the inserting holes 41, the fixing inserting blocks 61 are inserted into the fixing grooves 6, first matching portions 62 are arranged in side edges of one sides of the inserting holes 41 away from the fixing inserting blocks 61, second matching portions 63 are arranged on the connecting blocks 42, and the first matching portions 62 match the second matching portions 63.

Specifically, in the present embodiment, a total of six light bodies 1 and six joint assemblies 2 corresponding thereto are arranged, two ends of each light body 1 are each provided with one joint assembly 2, the mounting holes 21 with the openings in the upper ends are formed in each joint assembly 2, and an opening is also formed in one side of each mounting hole 21 to make the light bodies 1 convenient to pass through. The light bodies 1 pass through the upper openings to be directly inserted into the mounting holes 21, and the six light bodies 1 are mutually spliced to form a regular hexagon shape so as to form a closed loop. The clamping portions 22 located on the side walls of the outer sides of the mounting holes 21 are arranged on each joint assembly 2, the light bodies 1 are clamped in the mounting holes 21 by the clamping portions 22, so that the light bodies 1 are not separated. The clamping portions 22 are the elastic clamping pieces 221 and are arranged on the joint assembly 2 and located at upper ends of the side walls of the outer sides of the mounting holes 21, each elastic clamping piece 221 includes the vertical portion 5 and the microbend portion 51 which is arranged on the vertical portion 5 and bends in a direction towards the mounting hole 21, the vertical portion 5 performs limiting, the microbend portion 51 performs fixing, the elastic clamping piece 221 has certain elasticity for allowing a small deformation, and when the light bodies 1 are mounted, the microbend portion 51 of the elastic clamping piece 221 exposes the whole mounting hole 21, and after inserting into the mounting hole, the microbend portion 51 restores and fixes the light bodies 1.

Specifically, in the present embodiment, the connecting portions 4 are arranged at two ends of each light body 1, each connecting portion 4 is a tetrahedron fixing connecting block 42, the inserting holes 41 are formed in lower ends of the connecting portions 4, the connecting blocks 42 located at the copper sheet joint 28 assembly 2 are arranged on a bottom wall of the mounting groove, the connecting blocks 42 are inserted into the inserting holes 41, and thus the light bodies 1 and the joint assembly 2 are preliminarily positioned and connected. The chamfered surfaces 43 are formed between side end faces and upper end faces of the connecting portions 4, the vertical portions 5 of the elastic clamping pieces 221 limit the side end faces of the connecting portions 4, the microbend portions 51 of the elastic clamping pieces 221 cooperate with the chamfered surfaces 43 so as to perform fixing, and during dismounting, the elastic clamping pieces 221 only need to be gently picked to be separated from the light bodies 1, and the light bodies 1 are pulled up so as to be dismounted. After the connecting portions 4 of the light bodies 1 are inserted into the mounting holes 21, the clamping portions 22 clamp the connecting portions 4 to fix the connecting portions 4, and the light bodies 1 and the connecting portions 4 may be dismounted by being separated from connecting clamping of the connecting blocks 42 under an action of external force. The light bodies 1 and the joint assemblies 2 are connected more stably by arranging the connecting portions 4.

Specifically, in the present embodiment, the fixing grooves 6 are formed in the front sides of the connecting blocks 42, the second matching portions 63 are arranged in rear sides of the connecting blocks 42, the fixing inserting blocks 61 are arranged in the inserting holes 41, the fixing inserting blocks 61 are inserted into the fixing grooves 6, the first matching portions 62 are arranged on front sides of the inserting holes 41, the first matching portions 62 are first notches formed in side edges of one sides of the connecting portions 4 away from the light bodies 1, the second matching portions 63 are second notches formed in one sides of the connecting blocks 42 away from the light bodies 1, bottom walls of the first notches abut against bottom walls of the second notches, meanwhile, the connecting blocks 42 are inserted into the inserting holes 41, and the fixing inserting blocks 61 are inserted into the fixing grooves 6 so as to connect and fix the connecting portions 4 and the joint assemblies 2.

Specifically, in the present embodiment, by forming the mounting holes 21 with the openings in the upper ends, the light bodies 1 are inserted into the mounting holes 21 from above and clamped through the clamping portions 22, so the light bodies 1 are more convenient to mount and dismount and do not need to be pulled in a direction towards two sides by a certain distance for dismounting, and a service life of the joint assembly 2 may be ensured. The light bodies 1 are preliminarily positioned by arranging the inserting holes 41 and the connecting blocks 42, so that the mounting position is more accurate. The light bodies 1 are clamped into the mounting holes 21 by cooperation of the chamfered surfaces 43 and the elastic clamping pieces 221 so as to further fix the positions of the light bodies and cause the light bodies not to be separated.

Further, as a preferred implementation, a long-strip hole 251 is formed in the bottom plate 25.

Specifically, in the present embodiment, the long-strip hole 251 located on an outer side of the bottom shell 26 is formed in the bottom plate 25, the power-connecting copper sheets 27 are configured to be electrified, the copper sheet joints 28 are connected with the light bodies 1, and an electric current is transmitted to the light bodies 1 to make the light bodies 1 illuminate. A mounting position of the spliced light may be adjusted by forming the long-strip hole 251, which makes mounting more convenient.

Further, as a preferred implementation, each joint assembly 2 includes a tee joint 24, the tee joint 24 includes two male ports 241 and a female port 242, the male ports 241 and the female port 242 may be connected with the light bodies 1, the female port 242 of at least one tee joint 24 is connected with a power supply connector 3, and the power supply connector 3 is connected with a power supply for providing power.

Further, as a preferred implementation, each joint assembly 2 further includes a two-way joint 23, and the light bodies 1 may be connected with a port of the two-way joint 23.

Specifically, in the present embodiment, the male ports 241 and the female port 242 may be connected with the light bodies 1 so as to more conveniently splice the light bodies 1, and the female port 242 may also be externally connected with the power supply. The female port 242 is connected with the power supply connector 3, so that the external power supply may provide power for the light bodies 1. The light bodies 1 may be more conveniently spliced by arranging the two-way joint 23 and the tee joint 24, and there may be more shapes.

For the same or similar parts between the embodiments in the specification, reference may be made to each other. Each embodiment focuses on differences from other embodiments.

The foregoing descriptions are merely specific embodiments of the present application, but the protection scope of the present application is not limited thereto. Any changes or replacements within the technical scope disclosed in the present application made by those skilled in the art should fall within the scope of protection of the present application. Therefore, the scope of protection of this application shall take the scope of protection of the claims as final.

What is claimed is:

1. A spliced light, comprising joint assemblies and light bodies, wherein every two adjacent light bodies are connected through one joint assembly, mounting holes with openings in upper ends are formed in each joint assembly, and clamping portions located on side walls of outer sides of the mounting holes are arranged on the joint assembly; and each clamping portion is an elastic clamping piece, the elastic clamping pieces located on the side walls of the outer sides of the mounting holes are arranged on the joint assembly, and the light bodies are spliced into the mounting holes vertically and clamped through the elastic clamping pieces;

wherein each joint assembly comprises a bottom plate, a bottom shell, a power-connecting copper sheet and a copper sheet joint, the bottom shell is arranged on the bottom plate, the power-connecting copper sheet is arranged in the bottom shell, the copper sheet joint is connected with the power-connecting copper sheet, a shell cover is arranged on the bottom shell in a buckling manner, the mounting holes are formed in the shell cover, and the copper sheet joint is exposed out of the shell cover and located in the mounting holes.

2. The spliced light according to claim 1, wherein connecting portions are arranged at two ends of each light body.

3. The spliced light according to claim 2, wherein inserting holes are formed in bottoms of the connecting portions, connecting blocks located at a position of the copper sheet joint are arranged on a bottom wall of a mounting groove, and the connecting blocks are inserted into the inserting holes.

4. The spliced light according to claim 3, wherein chamfered surfaces are formed between side walls and top walls of the connecting portions, and the connecting portions are mounted in the mounting holes and clamped and fixed through cooperation of the elastic clamping pieces and the chamfered surfaces.

5. The spliced light according to claim 4, wherein a long-strip hole is formed in the bottom plate.

6. The spliced light according to claim 5, wherein each joint assembly comprises a tee joint, the tee joint comprises two male ports and a female port, the male ports and the female port may be all connected with the light bodies, the female port of at least one tee joint is connected with a power supply connector, and the power supply connector is connected with a power supply for providing power.

7. The spliced light according to claim 6, wherein each joint assembly further comprises a two-way joint, and the light bodies may be connected with ports of the two-way joint.

8. The spliced light according to claim 7, wherein the elastic clamping pieces located on side walls of two sides of each mounting hole are arranged on the joint assembly, each elastic clamping piece comprises a vertical portion and a microbend portion which are integrally formed, the vertical portions and side end faces of the light bodies match for limiting, and the microbend portions and the chamfered surfaces match to fix the light bodies.

9. The spliced light according to claim 8, wherein an opening is formed in a front side of each port of the joint assembly, fixing grooves are formed in the connecting blocks, fixing inserting blocks are arranged in the inserting holes, the fixing inserting blocks are inserted into the fixing grooves, first matching portions are arranged in side edges of one sides of the inserting holes away from the fixing inserting blocks, second matching portions are arranged on the connecting blocks, and the first matching portions match the second matching portions.

* * * * *